United States Patent Office 2,887,433
Patented May 19, 1959

2,887,433

FUNGICIDAL COMPOSITION COMPRISING CYCLOHEXIMIDE AND PENTACHLORONITROBENZENE

George Swank, Jr., Kalamazoo, Mich., assignor to The Upjohn Company, Kalamazoo, Mich., a corporation of Michigan No Drawing. Application April 18, 1958
Serial No. 729,257

10 Claims. (Cl. 167—33)

This invention relates to a fungicidal composition for the treatment of agricultural diseases, and more particularly, relates to a composition containing a mixture of two essential fungicidal ingredients. This invention also relates to a process for controlling agricultural fungus diseases with said composition.

This application is a continuation-in-part of application Serial No. 575,310, filed April 2, 1956, now abandoned.

Beta - [2 - (3,5 - dimethyl-2-oxocyclohexyl)-2-hydroxyethyl]-glutarimide is an antibiotic possessing antifungal activity which has already enjoyed a considerable success as a turf fungicide. This antibiotic is commonly known by its generic name, cycloheximide, by which name it will be referred to hereinafter, for reasons of convenience. The successful use of cycloheximide and ferrous sulfate in admixture for the control of melting-out (*Helminthosporium sativum*), fading-out (*Curvularia lunata*) and dollar-spot (*Sclerotinia homeocarpa*), all of which are commonly occurring turf diseases, has been reported by several invetigators; and the mixture is being marketed for the control of these diseases. On the other hand, the use of the same cycloheximide-ferrous sulfate mixture against Pythium-caused diseases and large brown patch (*Rhizoctonia solani*), which also are commonly occurring turf diseases, has led to partial and/or erratic control; e.g., see see Davis et al., Phytopathology 41, 657 (1951). It would be highly desirable, therefore, if cycloheximide could be adapted to the satisfactory control of Pythium-caused diseases and large brown patch.

It has now been unexpectedly discovered in accordance with the present invention that the addition of pentachloronitrobenzene to cycloheximide not only potentiates cycloheximide in the control of Pythium-caused disease, but also provides control of large brown patch.

It is therefore an object of the present invention to provide a fungicidal composition which is uniformly and satisfactorily effective against most of the important turf diseases, as well as many other fungus diseases occurring in the agricultural field. Another object of the present invention is to provide a composition in which the activity of cycloheximide against fungus-caused turf diseases is potentiated and enhanced. It is a further object of the present invention to provide a composition in which the activity of cycloheximide in th control of Pythium-caused turf diseases is potentiated. Other objects and features of the present invention will be apparent to one skilled in the art to which this invention pertains.

The foregoing and additional objects have been accomplished by the provision of a composition comprising an admixture of cycloheximide and pentachloronitrobenzene and of a process for the application thereof. Another embodiment of the invention resides in a composition which includes ferrous sulfate in addition to the above-named active ingredients, in order to minimize phytotoxic effects, such as chlorosis, and to enhance the fungicidal activity of the composition. Thus, the composition of the present invention is effective in the treatment of all of the major turf diseases, i.e., melting-out, fading-out, dollar-spot, large brown patch and Pythium-caused disease.

Cycloheximide is an antibiotic produced from *Streptomyces griseus*. It is fully described in U.S. Letters Patent 2,574,519. Its chemical name as noted above is beta - [2-(3,5-dimethyl-2-oxocyclohexyl)-2-hydroxyethyl]-glutarimide, and it has the following structural formula:

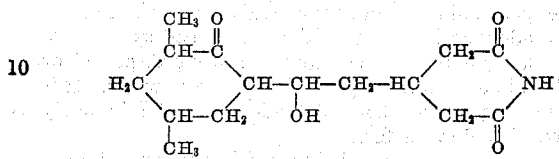

Pentachloronitrobenzene is an old compound having the following structural formula:

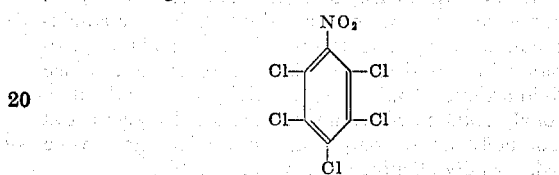

It can be prepared by methods disclosed in Beilsteins Handbuch der Organischen Chemie, fourth edition, 1922, vol. 5, page 247, and Qvist et al., Acta Acad. Aboensis Math. Phys. 8, No. 4, 30 pp. (1934), C.A. 29, 6885 (1935).

Alternatively, pentachloronitrobenzene can be obtained from commercial sources. Such commercial products can be admixed with cycloheximide in accordance with the present invention, but because they commonly contain impurities capable of causing a gradual loss of cycloheximide potency, it is desirable first to purify the commercial pentachloronitrobenzene, e.g., in the manner described hereinafter.

Prior to the present invention pentachloronitrobenzene has not been used or suggested for the control of turf diseases, although certain other fungicidal uses of this compound are well-known. Thus, pentachloronitrobenzene has been demonstrated to give excellent control of *Rhizoctonia solani*, which often causes root-rot and damping-off of seedlings and is being marketed for such purposes. Kendrick et al., Plant Disease Reporter, 38, 350–353 (1954), reported that pentachloronitrobenzene is effective against *Rhizoctonia solani, Sclerotinia sclerotinorium*, and *Pleospora lycopersici*; but is ineffective against *Fusarium solani*, var. *phaseoli, Pythium aphanidermatum, Pythium ultimum, Phythophthora citrophthora*, and *Phythophthora cinnamoni*, at ten, 100 and 1000 parts per million of active ingredient in potato dextrose agar. However, when used as a soil drench by Kendrick et al. pentachloronitrobenzene was not effective against any of these same test organisms. Thus, these data indicate that pentachloronitrobenzene is ineffective in the control of Pythium-caused disease.

Unexpectedly, and as a result of the present invention, it has now been found that the effect of cycloheximide in the control of Pythium-caused turf diseases is potentiated by pentachloronitrobenzene, and that the composition containing both cycloheximide and pentachloronitrobenzene is effective for the control of all major turf diseases which infest major turf areas, such as golf greens, fairways, lawns, parks, etc.

The amount of pentachloronitrobenzene to be admixed with cycloheximide can vary over a very wide range. A relatively small amount will produce a useful potentiating effect against Pythium. However, it is desirable to have sufficient pentachloronitrobenzene present to control large brown patch and thus broaden the antifungal spectrum of the composition.

Generally speaking, for practicable purposes, proportions by weight of cycloheximide to pentachloronitrobenzene of from 1:15 to 1:140, and preferably from 1:40 to 1:70 are very useful.

In order to minimize the phytotoxicity and enhance the fungicidal activity of the present composition, it is desirable to add ferrous sulfate thereto in an amount sufficient to provide from about ten to about 100 parts of ferrous sulfate to each part of cycloheximide, preferably from about twenty to about thirty parts to each part of cycloheximide, the parts being by weight.

The pentachloronitrobenzene and the cycloheximide can be admixed in any desired manner such as by mere mechanical mixing in solid form, or while dispersed or dissolved in a common liquid vehicle such as water. It is of course preferred that solid admixtures be in finely divided, free-flowing form.

The admixtures are applied to turf in any desired manner, such as in the form of a solid, for example, by dusting, or in the form of a liquid, for example, by spraying.

Compositions can be formulated by mixing the admixture containing the pentachloronitrobenzene and the cycloheximide with any desired liquid or solid carrier. Since the cycloheximide tends to lose activity in a moderately or strongly alkaline environment, e.g., a pH above about 8, moderately or strongly alkaline carriers are to be avoided. Mildly alkaline carriers are suitable.

With the exception noted above, most of the finely divided solid carriers known in the dusting art, which are preferably of large surface area, such as clay, for example, fuller's earth, pyrophyllite, talc, bentonite, Georgia clay, kieselguhr, diatomaceous earth, and the like, are suitable. Similarly, most of the commercial clays available on the market in finely divided form can be used, and particularly those which are normally employed as pesticidal (e.g., insecticidal, fungicidal, herbicidal) carriers. Commercial clays, it will be understood, are generally identified by trade names (reflecting the source and mode of processing), of which Homer Clay, Celite, Attaclay, Pyrax ABB, Dixie Clay, Talc Emco No. 23, and Tripoli may be mentioned as typical.

Non-clay carriers which can be formulated with the present fungicidal composition include, for example, sulfur, volcanic ash, calcium carbonate, sodium sulfate, sucrose, glucose, ethyl cellulose, and flour, such as wood, walnut shell, wheat, soybean, potato, cottonseed, and the like.

The mixture can be prepared by any suitable method. Thus, if a solid, the active ingredients can be ground to a fine powder separately and tumbled together or the active ingredients can be ground together; alternatively, one active ingredient in liquid form, including solutions, dispersions, emulsions, and suspensions thereof, can be admixed with the other active ingredient in finely divided form in amounts small enough to preserve the free-flowing property of the final dust composition. Or excess liquid can be removed, such as by vaporization, for example, under reduced pressure. The same applies to mixtures of the active ingredients and any finely divided solid carrier and/or other material.

When solid compositions are employed, in order to obtain a high degree of turf coverage with minimum poundage per unit area, it is desirable that the composition be in finely divided form. Preferably, the dust containing the active ingredients should be sufficiently fine that substantially all will pass through a 50 mesh sieve, and more particularly through a 200 mesh sieve.

For spray application the admixture can be dissolved or dispersed in a liquid carrier, such as water or other suitable liquid.

Aqueous solutions or dispersions are economical and desirable. In general, the choice of the particular liquid carrier employed will be guided somewhat by prevailing circumstances, such as its availability, its solubility or dispersion characteristics toward the particular admixture employed, and/or its toxicity toward the turf undergoing treatment. In general, water is an excellent liquid carrier.

Thus, spray formulations comprising the active ingredients in the form of a solution, suspension, dispersion, or emulsion, in aqueous or non-aqueous media, can be employed.

Emulsions or dispersions of the admixture in the liquid carrier can be prepared by agitation of the admixture with the carrier. This is commonly done at the time of spraying. Preferably, however, the agitation should take place in the presence of an emulsifying or dispersing agent (surface-active agent), in order to facilitate the preparation of said emulsion or dispersion. Emulsifying and dispersing agents are well known in the art, and include, for example, fatty alcohol sulfates, such as sodium lauryl sulfate, aliphatic or aromatic sulfonates, such as sulfonated castor oil or the various alkaryl sulfonates (such as the sodium salt of monosulfonated nonyl naphthalene or tertiary dodecyl benzene), and non-ionic types of emulsifying and dispersing agents such as the high molecular weight alkaryl or alkyl polyglycolethers or analogous thioethers such as the octylphenyl, decyl, dodecyl and tetradecyl polyglycolethers and thioethers containing from 25 to 75 carbon atoms.

The use, if desired, of adjuvants, such as wetting agents and/or humectants, is also contemplated in connection with solid formulations and solutions or dispersions of the admixture, such as water dispersions. Any suitable wetting agent and/or humectant can be employed for this purpose, such as the wetting agents more particularly referred to above. Examples of humectants are glycerine, diethylene glycol, ethylene glycol, polyethylene glycols generally, and well known sugar-containing mixtures, such as corn syrup and honey.

For wetting purposes, the amount of wetting agent used can be considered to be that required to impart the desired wetting qualities to the formulation, whether used in finely divided solid form or as a spray, or otherwise, such as from approximately 0.0005 percent to 2.0 percent by weight of total formulation.

It should be considered that once the formulation has been applied to the turf, the concentration of wetting agent existing upon the plants is in no sense a function of the concentration existing in the original formulation, particularly in the case of a spray. Thus, evaporation might concentrate the wetting agent considerably in the case of a spray, or the presence of dew on the plant surfaces, or of plant juices on the plant surfaces might considerably dilute the wetting agent.

Although the admixture of the active ingredients can be applied to the turf in concentrated form, it is preferred to employ liquid or solid formulations, for example, as discussed above, in which the active ingredients constitute from about five percent to about eighty percent by weight in the case of solid formulations, and from about 0.05 percent to about 0.2 percent by weight in the case of liquid formulations. All factors considered, the overall concentration of the active ingredients can vary from about 0.0004 percent to about five percent by weight of cycloheximide and from about 0.05 to about 85 percent by weight of pentachloronitrobenzene. Higher concentrations can be used but involve disadvantages in economy, manufacture and/or use.

Other substances than the carrier and/or surface-active agent can be included in solid or liquid formulations if desired. Thus, active ingredients and/or materials which the operator may wish to apply other than those disclosed herein and compatible with the admixture can be added if desired for any particular purpose. Also, substances can be added to bring about various physical improvements such as the prevention of lumping during storage, or improvement with respect to coverage, moisture adsorption, adherence, and the like. Other active ingredients and/or potentiators can be included in said formulations to accomplish various physiological or other effects. For example, it may at times be expedient to include singly or in combination, substances such as insecticides, bactericides, fertilizers, plant response agents, and fungicides other than those discussed herein. Ingredients which are incompatible with the active ingredients of the present composition are to be avoided. Chlordane is an example of an insecticide which is thus incompatible.

In practice of the process of the present invention, the rate of application (i.e., the amount of admixture per unit area), for best results, will depend, among other variables, upon the particular disease or diseases, the type of turf, maturity of the turf, and environmental conditions such as temperature, moisture, humidity, and the like. Since the above-indicated variables can be present in various combinations, it is impossible to specify a rate of application which will be suitable for every possible condition which may be encountered. However, under ordinary conditions, an embodiment of the composition coming within the preferred range specified above, when used as a spray, is preferably applied at the rate of from 1.5 to 2.5 ounces in five gallons of water per 1000 square feet of turf area. Generally, one application is sufficient to obtain complete control of each disease outbreak. Where the environmental conditions favor more frequent outbreaks, more frequent applications are required.

The following examples are illustrative of the compositions and process of this invention but are not to be construed as limiting. The parts given therein are by weight.

EXAMPLE 1

A preferred embodiment of the present composition of cycloheximide and pentachloronitrobenzene is prepared using the following ingredients in the amounts stated:

75 parts by weight of pentachloronitrobenzene
1.3 parts by weight of cycloheximide
0.3 part by weight of octylphenyl polyglycolether (Triton X-100)
0.9 part by weight of polymerized sodium salt of a substituted benzoid alkyl sulfonic acid (Daxad 27)
22.5 parts by weight of Georgia clay These materials are blended together and milled through an 0.012 inch linear slot HB screen to give an approximately 325 mesh particle size. This composition has a ratio of active ingredients of 57 parts pentachloronitrobenzene to one part of cycloheximide.

Using the composition of Example 1, the following Tests I, II, and III illustrate the effectiveness of the foregoing composition in the control of turf diseases.

Test I.—Large brown patch and dollar-spot

The composition of cycloheximide and pentachloronitrobenzene was applied as a spray on July 8, 20, 27, August 3, 14, 22, and 27, 1955, at the rate of one ounce in three gallons of water to an area 12 feet x 48 feet in a turf garden at Ames, Iowa with the use of a Bean Spray Pal power sprayer. The operator stated that the composition did an excellent job in controlling dollar-spot and large brown patch, and there were no observable off-color effects following the applications.

Test II.—Large brown patch and melting-out

The superintendent of a country club at Oak Park, Illinois, applied the cycloheximide and pentachloronitrobenzene composition on July 6, 14, 20, 25, August 1, 10, and 16, 1955, at the rate of six ounces in 35 gallons of water. The spray was applied to 6,000 square feet of Washington bentgrass with the use of a power sprayer. The superintendent observed no disease on the treated plots during the test. Large brown patch, caused by *Rhizoctonia solani*, and melting-out, caused by *Helminthosporium sativum*, occurred in other areas on the golf course on July 20 and August 10, 1955.

Test III.—Pythium disease

The superintendent of a country club at Evanston, Illinois, applied the cycloheximide and pentachloronitrobenzene composition at a dosage level of three ounces of formulated material in five gallons of water per 1000 square feet of C-15 bentgrass on August 4, 1955, for the control of Pythium. The superintendent reported that excellent control of the organism was obtained within 24 hours and that no recurrence of the disease occurred during the remainder of the growing season.

The effectiveness of the composition of Example 1 in controlling turf diseases is further illustrated by the results of tests employing this composition and conducted during the summer of 1955 at golf clubs located in the Midwestern, Southwestern, Middle Atlantic, and New England sections of the United States, the particular locations being as follows: Ann Arbor, Detroit, Warren, and Kalamazoo, Michigan; Cincinnati, Ohio; Indianapolis, Indiana; Louisville and Fort Knox, Kentucky; Midlothian, Homewood, Oak Park, Chicago, Evanston, and Elmhurst, Illinois; Dodson, Missouri; Ames, Iowa; Minneapolis, Minnesota; Tulsa, Oklahoma; West field and Sparrows Bush, New Jersey; Pittsburgh, Bethlehem, and West Conshohocken, Pennsylvania; Baltimore, Bethesda, Hagerstown and Pikesville, Maryland; Richmond and Blacksburg, Virginia; Marlboro, Concord, Lowell, and Weston, Massachusetts; and Warwick and Providence, Rhode Island. The geographic locations were selected on the basis of expected severity of disease development. The selections of bentgrass employed in the tests included Washington, Toronto, Congressional, Arlington, Collins, Columbia, Seaside, South German, Kernwood Velvet, Penlu, and mixed bentgrasses of unknown origin. Standard equipment (hose-on proportioner, McLean barrel sprayer, power sprayer) was used to apply the composition, made up as spray material, to turf. The test areas received the same fertilizer and insecticide treatments and had the same management practices as the near-by non-test areas, i.e., control areas. Evaluation of the effectiveness of the composition was based on prophylactic effect (i.e., prevention of turf disease), therapeutic effect (i.e., cure of turf disease already present before treatment), and residual effect (i.e., prolonged duration of fungicidal activity).

The composition when applied to turf, at dosages of solid material as low as one ounce of solid material per 1000 square feet of turf and in the manner described above, controlled large brown patch in 34 of 36 tests. Increasing the dosages (applications at weekly intervals) gave increased effectiveness, except that at dosages above 1.6 ounces of solid material per 1000 square feet of turf no further increase in immediate effectiveness was observed. However, a single application to bentgrass (selection Penlu) at a dosage of 4.8 ounces of solid material per 1000 square feet of turf prevented large brown patch for 39 days, thus demonstrating that the residual fungicidal activity of the composition is excellent. Both prophylactic and therapeutic effectiveness were demonstrated, depending upon the particular tests. Slight phytotoxic effects were noted in eastern Massachusetts; eastern Pennsylvania; Dodson, Missouri; Detroit, Michigan; and Tulsa, Oklahoma e.g., rates of spray application greater than those required for control of large brown patch caused yellowing of the bentgrass in Dodson, Missouri; Detroit, Michigan; and Concord, Massachusetts. The use of lower spray rates, applied at weekly intervals to the same general areas, did not lead to phytotoxic effects. Tests were conducted at Tulsa, Oklahoma, and West Conshohocken, Pennsylvania, in which the spray material prepared from the composition also contained sufficient ferrous sulfate to afford a dosage of the latter of two ounces per 1000 square feet of turf; there were no phytotoxic effects, in contrast to the slight phytotoxic effects appearing in the absence of ferrous sulfate.

The composition when applied to turf as sprays in the manner described above controlled dollar-spot in all of four tests; melting-out in all of six tests; fading-out in both of two tests; and Pythium-caused disease in three of four tests, the fourth test showing marked improvement.

EXAMPLE 2

Following the procedure of Example 1, a preparation containing ferrous sulfate in addition to cycloheximide and pentachloronitrobenzene can be prepared by adding 31 parts of ferrous sulfate per 100 parts of the composition disclosed therein.

EXAMPLE 3

When commercial pentachloronitrobenzene marketed as a wettable powder having, by weight, 75 percent of pentachloronitrobenzene and 25 percent of inert ingredients, or technical pentachloronitrobenzene of 95 to 96 percent purity, is admixed with cycloheximide a loss in potency of cycloheximide often results when the admixture is stored for prolonged periods at elevated temperatures. Although such severe conditions are not ordinarily encountered in the commercial storage and use of the composition of this invention, for optimum shelf life, it is desirable that a product of greater stability be prepared.

The following procedure is used to purify technical pentachloronitrobenzene of 95 to 96 percent purity. An alkaline citrate wash solution (molar with respect to sodium hydroxide and 0.15 molar with respect to citric acid) is prepared from the following ingredients:

|  | Lbs. |
|---|---|
| Citric acid | 24.0 |
| Sodium hydroxide | 33.4 |
| Water, sufficient to make 100 gallons. | |

The technical pentachloronitrobenzene is dissolved in ethylene dichloride using sixty gallons of the latter per 100 pounds of the former. The heat of solution of pentachloronitrobenzene in ethylene dichloride is negative and the solution is warmed to between twenty and 25 degrees centigrade. The solution is extracted with 0.1 volume of the above alkaline citrate solution by stirring for fifteen minutes, making certain that agitation is sufficiently vigorous to give an intimate dispersion of the two layers. The ethylene dichloride is separated, and a second extraction with 0.05 volume of fresh alkaline citrate solution is made. A third extraction is made using 0.1 volume of 0.1 percent aqueous citric acid solution. If the pH of the third extract is above 6, a fourth extraction is made using 0.1 volume of 0.1 percent aqueous citric acid solution. The ethylene dichloride is removed by distillation, and the residue is dried. When the thus-purified pentachloronitrobenzene (M.P. 145-147 degrees centigrade) is combined with cycloheximide, no loss in potency of cycloheximide occurs when the composition is held at sixty degrees centigrade for at least eight weeks. By way of further example, a production lot including thus-purified pentachloronitrobenzene (75 parts), cycloheximide (1.5 parts), octylphenyl polyglycolether (0.3 part), polymerized sodium salt of substituted benzoic alkyl sulfonic acid (0.9 part), and Georgia clay (22.3 parts) prepared in accordance with the procedure outlined in Example 1 had no loss in cycloheximide activity at the end of eight months when held at 26 degrees centigrade.

EXAMPLE 4

An embodiment of the present composition wherein a package containing the active ingredients in separate containers is prepared as follows.

Twenty-four ounces of a wettable powder having, by weight, 75 percent of pentachloronitrobenzene and 25 percent of inert ingredients are packaged in a bottle. A second bottle containing 6.35 ounces of the following mixture is also prepared:

5 parts by weight of cycloheximide
95 parts by weight of pyrophyllite

The cycloheximide and part of the pyrophyllite are microatomized together and blended with the remainder of the pyrophyllite to give a five percent active composition. The two bottles containing the materials are placed in one package with instructions for extemporaneous preparation of a spray mixture. Using the composition of this example, spray mixtures are prepared as follows: (1) to a spray tank containing one-half the required quantity of water, the necessary amounts of cycloheximide and pentachloronitrobenzene are added (no premixing of the dry contents of the respective bottles is necessary); (2) the agitator is started, and the required amounts of other materials (if used), such as ferrous sulfate, fertilizers, insecticides, and the like, are added; (3) the remainder of the water is added while the agitator is running. Recommended dosages to be used in controlling the various turf diseases are shown in the following Table 1:

TABLE 1

TO CONTROL DOLLAR-SPOT

| If the area to be treated is— | Use this amount of contents of pentachloronitrobenzene bottle and, | This amount of contents of cycloheximide bottle | In this amount of water, gal. |
|---|---|---|---|
| 1,000 sq. ft. | 4 level tablespoonfuls | 1 level tablespoonful | 4 |
| 5,000 sq. ft. | 6 ounces | 1.5 ounces | 20 |
| 20,000 sq. ft. | 24 ounces | 6.35 ounces | 100 |

TO CONTROL LARGE BROWN PATCH, MELTING-OUT, AND FADING-OUT

| 1,000 sq. ft. | 5½ level tablespoonfuls. | 1½ tablespoonfuls | 5 |
| 5,000 sq. ft. | 8 ounces | 2.1 ounces | 25 |
| 15,000 sq. ft. | 24 ounces | 6.35 ounces | 100 |

TO CONTROL PYTHIUM

| 1,000 sq. ft. | 4-6 level tablespoonfuls [1] | 1-1½ tablespoonfuls [1] | 5 |
| 5,000 sq. ft. | 8-12 ounces [1] | 2-3 ounces [1] | 25 |
| 15,000 sq. ft. | 24-36 ounces [1] | 6.35-9.4 ounces [1] | 100 |

[1] High concentrations may cause a slight yellowing of the grass blades unless ferrous sulfate is used.

The spray mixture should not be "watered-in," but instead should be permitted to dry on the grass. Ferrous sulfate, if used, should be added to the spray mixture at a concentration sufficient to provide a dose of one-half ounce per 1,000 square feet of turf area.

An additional embodiment is prepared through substituting the 75 percent of pentachloronitrobenzene and 25 percent of inert ingredients by 85 percent of pentachloronitrobenzene and 15 percent of inert ingredients.

EXAMPLE 5

A satisfactory embodiment of the present composition of cycloheximide and pentachloronitrobenzene is prepared using the following ingredients in the amounts stated:

85.0 parts by weight of pentachloronitrobenzene
1.4 parts by weight of cycloheximide
0.3 part by weight of octylphenyl polyglycolether (Triton X-100)
0.9 part by weight of polymerized sodium salt of a substituted benzoic alkyl sulfonic acid (Daxad 27)
12.4 part by weight of Georgia clay Although the invention has been more particularly described in connection with the prevention and/or treatment of turf-affecting diseases, it will be understood that the present composition and process are also effective in the prevention and/or treatment of other agricultural diseases caused by fungi, e.g., control of soil-borne fungi, particularly Pythium spp. which cause damping-off and root-rot of seedlings, and control of pea and cotton infestations by seed and row treatment.

As used in the appended claims, the word "dispersion" is intended to have a generic meaning covering suspensions, colloidal solutions, and true solutions.

It is to be understood that the invention is not to be limited to the exact details of operations or compositions shown and described, as obvious modifications and equivalents will be apparent to one skilled in the art, and the invention is therefore to be limited only by the scope of the appended claims.

What is claimed is:

1. A composition useful for the control of Pythium-caused agricultural diseases comprising about one part by weight of cycloheximide to about sixty parts by weight of pentachloronitrobenzene.

2. The composition of claim 1 which includes ferrous sulfate.

3. A composition useful for the control of Pythium-caused agricultural diseases comprising from about 0.0004 percent to about five percent by weight of cycloheximide and from about 0.05 to about 85 percent by weight of pentachloronitrobenzene.

4. A composition useful for the control of Pythium-caused agricultural diseases comprising from about 0.0015 percent to about 0.005 percent by weight of cycloheximide and from about 0.1 percent to about 0.3 percent by weight of pentachloronitrobenzene.

5. A composition useful for the control of Pythium-caused agricultural diseases comprising about 0.004 percent by weight of cycloheximide, about 0.25 percent by weight of pentachloronitrobenzene, and a liquid carrier.

6. The composition of claim 5 wherein the liquid carrier is in the form of a sprayable aqueous dispersion containing a surface-active agent and has a pH below about pH 8.

7. A process for the control of Pythium-caused agricultural diseases, which comprises the application to the disease area of a composition comprising from about 0.0004 percent to about five percent by weight of cycloheximide and from about 0.05 to about 85 percent by weight of pentachloronitrobenzene.

8. The process of claim 7 wherein the composition includes a sprayable aqueous carrier.

9. A process for the control of Pythium-caused agricultural diseases which comprises the application to the disease area of a composition comprising from about 0.0004 percent to about five percent by weight of cycloheximide and a composition comprising from about 0.05 to about 85 percent by weight of pentachloronitrobenzene, both compositions being applied at approximately the same time to enable the active ingredients to coact in controlling the disease.

10. The process of claim 9 wherein at least one composition contains ferrous sulfate.

No references cited.